United States Patent [19]

Clarke

[11] 4,331,104
[45] May 25, 1982

[54] BIRDFEEDER

[75] Inventor: Stephen G. Clarke, Coventry, Conn.

[73] Assignee: Clarke Products Co., Inc., West Hartford, Conn.

[21] Appl. No.: 201,795

[22] Filed: Oct. 29, 1980

[51] Int. Cl.³ ............................................. A01K 39/01
[52] U.S. Cl. ............................... 119/52 R; 119/51 R
[58] Field of Search ..................... 119/51 R, 52 R, 53

[56] References Cited

U.S. PATENT DOCUMENTS

| | | | |
|---|---|---|---|
| 2,195,575 | 4/1940 | Mallgraf | 119/52 |
| 3,182,635 | 5/1965 | Waite | 119/51 |
| 3,211,130 | 10/1965 | Prince | 119/51 |
| 3,919,977 | 11/1975 | Clark | 119/52 R X |
| 4,030,451 | 6/1977 | Miller | 119/51 R |
| 4,077,361 | 3/1978 | Thorp | 119/52 R |
| 4,102,308 | 7/1978 | Kilham | 119/52 R |
| 4,201,155 | 5/1980 | Hyde, Jr. | 119/51 R |
| 4,207,839 | 6/1980 | Barry | 119/51 R |
| 4,223,637 | 9/1980 | Keefe | 119/52 R |

*Primary Examiner*—Gene Mancene
*Assistant Examiner*—Robert P. Swiatek

[57] ABSTRACT

A birdfeeder comprising a body extending along a vertical axis, the body having an outer shell, a wall inside the shell, the shell and the wall defining a reservoir, the shell and the wall further defining a restricted chute, and a feed tray inside the shell, the chute communicating between the reservoir and the tray to provide gravity feed of seed, and a fly-in access opening in the shell, the access opening communicating between the exterior of the shell and the tray and being large enough to allow birds to fly into the shell, the extent of the shell between the opening and the upper end of the body being large enough to prevent squirrels resting on the end from reaching into the opening.

33 Claims, 4 Drawing Figures

BIRDFEEDER

FIELD OF THE INVENTION

This invention relates to birdfeeders.

BACKGROUND OF THE INVENTION

Many efforts have been made to design a hanging squirrel-proof feeder.

SUMMARY OF THE INVENTION

I have invented a feeder that virtually eliminates the squirrel problem, and yet allows feeding birds to be readily observed. Moreover, my feeder is easily and inexpensively manufactured and assembled, provides a continuous and protected supply of seed without substantial seed loss, has a very large feed capacity, is usable even in extremes of weather, and is very durable.

In general the invention features a birdfeeder comprising a body extending along a vertical axis, the body having an outer shell, wall means inside the shell, the shell and the wall means defining a reservoir, the shell and the wall means further defining a restricted chute, and a feed tray inside the shell, the chute communicating between the reservoir and the tray to provide gravity feed of seed, and a fly-in access opening in the shell, the access opening communicating between the exterior of the shell and the tray and being large enough to allow birds to fly into the shell, the extent of the shell between the opening and the upper end of the body being large enough to prevent squirrels resting on the end from reaching into the opening.

In preferred embodiments the body has an axially extending shell having upper and lower wall portions, the wall portions intersecting along their peripheries in a plane transverse to the axis, the plane defining the maximum transverse section of the body, the upper wall portion having a convexly curved exterior surface extending from the axis to the plane, an axially extending wall means inside the shell, the upper wall portion of the shell and the wall means defining an axially extending reservoir, the lower wall portion of the shell and the wall means defining an axially extending chute, a transversely extending feed tray inside the shell, the chute communicating between the reservoir and the tray, and an access opening in the lower wall portion of the shell, the access opening communicating between the exterior of the shell and the tray.

In preferred embodiments the access opening is positioned sufficiently close to the tray such that a feeding bird is able to reach the tray without fully entering the shell; the access opening is transverse to the axis; the access opening comprises a pair of opposed openings aligned along a line transverse to the axis; the upper wall of the shell extends sufficiently from the axis to prevent a squirrel mounted on the upper wall at the axis from reaching around the shell and through the access opening; the exterior surface of the upper wall of the shell is sufficiently smooth and curved to prevent a squirrel from climbing along the top of the shell; the radius of curvature of the upper wall portion is no greater than 9 inches; the access opening is sufficiently small to exclude birds larger than a predetermined size; the body is clear Lexan; there is a hanger rotatably mounted to the body; there is a seed filling port in the shell and an aluminum bell-shaped cover slidably mounted on the hanger covering the port; the cover has a means for gripping the hanger to hold it at selected positions along the hanger; the tray has a transversely extending floor portion to accommodate groundfeeders and a sidewall portion having an integral retainer for receiving a wooden perch to accommodate clingers; the walls of the shell are spherical; the shell is cylindrical; there are a plurality of trays inside the housing, and the lower wall portion of the shell and the wall means define a corresponding plurality of axially extending chutes communicating between the reservoir and the trays; and the trays are spaced at least seven inches from one another to maximize exposure of the feeding birds for easy viewing, and to give birds freedom of flight up to the perches and trays.

PREFERRED EMBODIMENT

The structure and operation of a preferred embodiment of the invention will now be described, after first briefly describing the drawings.

DRAWINGS

STRUCTURE

Figure 1:
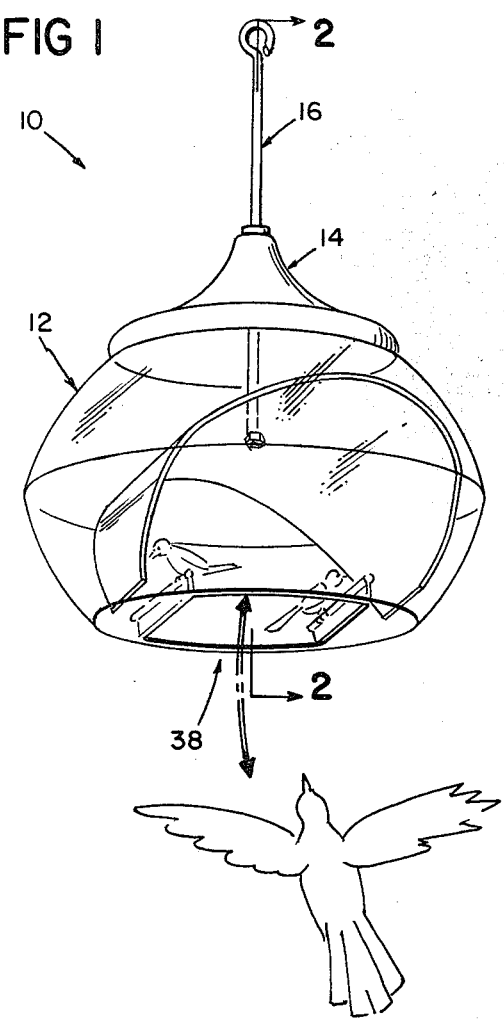
FIG. 1 is a somewhat schematic perspective view of the preferred embodiment having a bottom entry or fly-up access.

FIG. 1 shows a birdfeeder 10 having a clear plastic (0.100 inch Lexan) body 12, a metal (0.0625 inch aluminum) cover 14, and a metal (0.250 inch O.D. plated steel rod) hanger 16.

Figure 2:
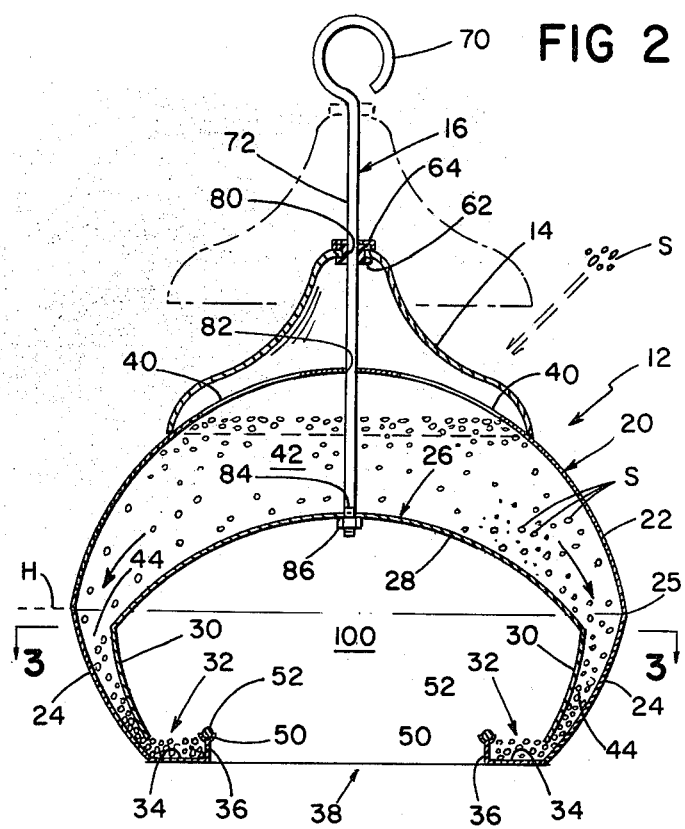
FIG. 2 is a sectional view at 2—2 of FIG. 1.
Figure 3:
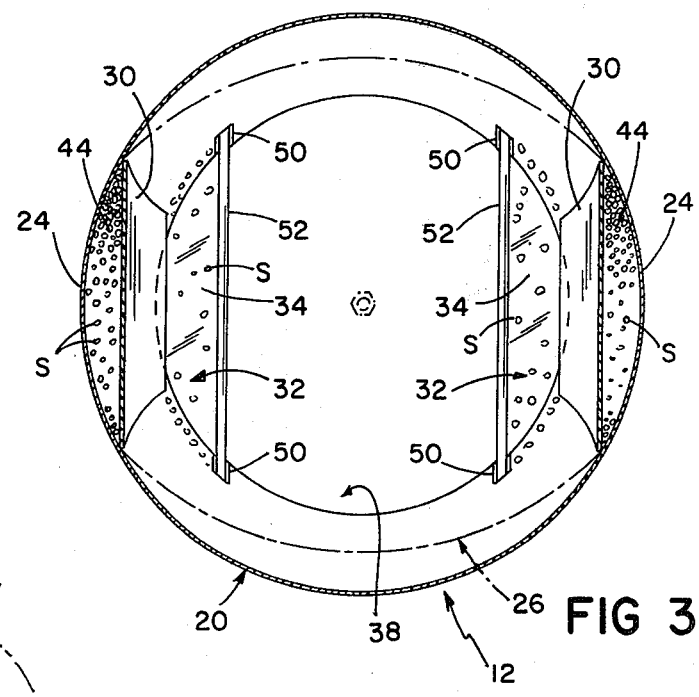
FIG. 3 is a sectional view at 3—3 of FIG. 2.

Referring to FIGS. 2 and 3, body 12 has an outer shell 20 having upper and lower spherical (7.00 inch radius) wall portions 22, 24 joined along periphery 25 at horizontal plane H (the plane of maximum lateral extent of the body), an inner arch (6.00 inches high) 26 having curved upper dome (7.875 inch radius) and lower wall (5.875 inch radius) portions 28, 30, a pair of seed trays 32, each having floor (1.50 inch wide) and sidewall portions 34, 36, and a bottom access opening (10.00 inch diameter) 38. Wall 22 has a pair of oval filling ports 40. Wall 22 and dome 28 define seed reservoir 42. Walls 24 and 30 define a pair of seed chutes 44, which communicate between the reservoir and the seed trays. Each sidewall 36 has a pair of integral retainers 50 for receiving a perch (unfinished 8 inch long, 0.25 inch diameter wooden dowel) 52. The perches are spaced 7 inches from each other.

Bell-shaped (4.50 inch high, 4.50 inch radius) cover 14 has a rubber (neoprene) sealing ring or grommet 62 and an aluminum protective cap 64.

Hanger 16 has a hook portion 70 and a rod portion 72.

Cover 14 is slidably mounted on body 10 by inserting rod 72 of hanger 16 through holes 80, 82, 84 in the body and fastening nut (¼-20 hex nylon) 86 on the threaded end of the rod.

Operation

Reservoir 42 is easily filled by sliding cover 14 up rod 72 (as shown in phantom in FIG. 2), sealing ring 62 providing adequate friction to hold the cover in a raised position, and pouring seed S through ports 40. (The very large reservoir holds up to 1½ gallons of seed). The seed feeds by gravity from the reservoir through chutes 44 into trays 32. Cover 14 is lowered, and the birdfeeder is hung by hook 70 from a tree or other suitable point at least three feet from any object that might serve as a platform for squirrels or other such animals to jump up into the feeder. Body 12 rotates about hanger 16 so that the feeder may be oriented to provide the best possible angular position for viewing.

Birds fly upwardly (FIG. 1) through opening 38 to enclosed feeding area 100. Trays 32 accommodate both clingers (perchers) and ground feeders. Clingers feed from perches 52 and ground feeders stand on floors 34. The wide spacing of the perches promotes maximum exposure of each bird in the feeder for viewing. The long perch length allows several birds to feed at the same time. However, a bird need not go completely inside the body, because the access opening is positioned sufficiently close to the trays such that a feeding bird may reach the trays without fully entering the shell.

As the birds feed, the seed trays are continually replenished from the reservoir. The enclosed feeding area provides protection for both the seed and the birds from wind and other adverse weather conditions.

The overall geometry of the body makes the feeder squirrel-proof. A squirrel climbing along the top of the feeder is unable to cling to the smooth outwardly curving surfaces of cover 14 and upper wall 22 of outer shell 20. Periphery 25 of shell 20 is far enough away from hanger 16 so that a squirrel on upper wall 22 clinging by its hind legs from the hanger is unable to reach around the shell and into access opening 38.

Access opening 38 may be sized to selectively exclude certain types of birds from using the feeder. For example, a 7 inch opening would permit cardinals to enter the feeding area, but prevent access by bluejays.

The clear plastic body not only allows the feeding birds to be observed, but also permits the seed level in the large capacity reservoir to be conveniently monitored. Also, Lexan is highly resistant to weathering and, in particular, it can be subject to a wide range of temperatures without cracking.

ALTERNATIVE EMBODIMENTS

Figure 4:
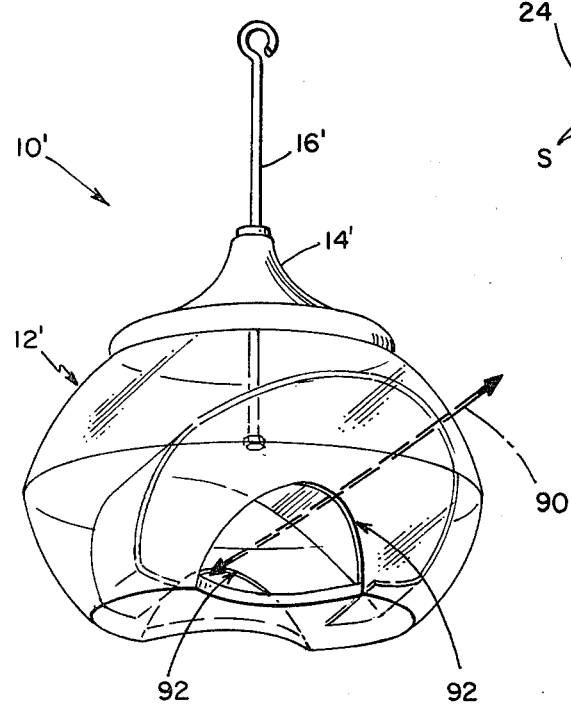
FIG. 4 is a somewhat schematic perspective view of an alternative embodiment having a side entry or fly-through access.

Other embodiments of the invention are within the following claims. For example, FIG. 4 shows an alternative embodiment in which access is through a fly-through 90 comprising a pair of opposed openings 92 in the side of body 12'. Openings 92 are beyond the reach of a squirrel clinging by its hind legs from hanger 16'. The openings may be sized to selectively exclude bird types.

Also, the shape of the shell could be varied. For example, the shell could be cylindrical and have a bell-shaped cover.

What is claimed is:

1. A birdfeeder comprising:
   a body extending along a vertical axis, said body having
   an axially extending shell having upper and lower wall portions, said wall portions intersecting along their peripheries in a plane transverse to said axis, said plane defining the maximum transverse section of said body, said upper wall portion having a convexly curved exterior surface extending from said axis to said plane,
   axially extending wall means inside said shell,
   said upper wall portion of said shell and said wall means defining an axially extending reservoir therebetween.
   said lower wall portion of said shell and said wall means defining an axially extending chute therebetween, and
   a transversely extending feed tray inside said shell, said chute communicating between said reservoir and said tray, and
   an access opening in said lower wall portion of said shell, said access opening communicating between the exterior of said shell and said tray.

2. The birdfeeder of claim 1 wherein said access opening is transverse to said axis.

3. The birdfeeder of claim 1 wherein said access opening comprises a pair of opposed openings aligned along a line transverse to said axis.

4. The birdfeeder of claim 2 or 3 wherein said upper wall portion of said shell extends sufficiently from said axis to prevent a squirrel mounted on said upper wall portion with its hind legs at said axis from reaching around said shell and through said access opening.

5. The birdfeeder of claim 2 or 3 wherein said access opening is sufficiently small to exclude birds larger than a predetermined size.

6. The birdfeeder of claim 2 or 3 wherein said access opening is no greater than 10 inches across.

7. The birdfeeder of claim 2 or 3 further comprising a hanger, said hanger having a rod portion extending along said axis and mounted to said body and a hook portion extending from said rod portion of said hanger.

8. The birdfeeder of claim 7 further comprising means for rotatably mounting said hanger to said body.

9. The birdfeeder of claim 7 further comprising:
   a port in said upper wall of said shell, said port communicating between the exterior of said shell and said reservoir, and
   a cover slidably mounted above said body on said rod, said cover extending sufficiently from said axis to cover said port.

10. The birdfeeder of claim 9 wherein said cover has a means for gripping said rod, said gripping means holding said cover at selected positions along said rod.

11. The birdfeeder of claim 10 wherein said cover has a mounting hole therein, said rod extending through said hole, and said gripping means comprising a rubber grommet mounted in said hole, the inner diameter of said grommet being sufficiently small for said grommet to grip said rod.

12. The birdfeeder of claim 9 wherein said cover is bell-shaped, thereby preventing squirrels from getting a claw hold thereon.

13. The birdfeeder of claim 9 wherein said cover is aluminum.

14. The birdfeeder of claim 2 or 3 further comprising a port in said upper wall of said shell, said port communicating between the exterior of said shell and said reservoir.

15. The birdfeeder of claim 1, 2 or 3 wherein the exterior surface of said upper wall portion of said shell is sufficiently smooth and curved to prevent a squirrel from climbing therealong.

16. The birdfeeder of claim 15 wherein the radius of curvature of said upper wall portion is no greater than 9 inches.

17. The birdfeeder of claim 1, 2 or 3 wherein said walls of said shell are spherical.

18. The birdfeeder of claim 1, 2 or 3 wherein there are a plurality of said trays inside said body, and said lower wall portion of said shell and said wall means define a corresponding plurality of axially extending chutes, said chutes communicating between said reservoir and said trays.

19. The birdfeeder of claim 18 wherein there are two trays and two chutes in said body.

20. The birdfeeder of claim 19 wherein said trays are transversely spaced at least 7 inches from each other.

21. The birdfeeder of claim 18 wherein said access opening is positioned sufficiently close to said trays such that a feeding bird is able to reach said trays without fully entering said shell.

22. The birdfeeder of claim 1 wherein said shell is clear plastic.

23. The birdfeeder of claim 22 wherein said wall means is clear plastic.

24. The birdfeeder of claim 22 or 23 wherein said shell and said wall means are Lexan.

25. The birdfeeder of claim 1 wherein said feed tray has a transversely extending floor portion and an axially extending sidewall portion.

26. The birdfeeder of claim 25 wherein said sidewall portion has an integral retainer for receiving a wooden perch.

27. The birdfeeder of claim 25 wherein said floor portion extends sufficiently in said transverse direction to permit a feeding bird to stand thereon.

28. The birdfeeder of claim 1 wherein said access opening is positioned sufficiently close to said tray such that a feeding bird is able to reach said tray without fully entering said shell.

29. A birdfeeder comprising:

a body extending along a vertical axis, said body having
an outer shell,
wall means inside said shell,
said shell and said wall means defining a reservoir and a restricted chute therebetween, and
a feed tray inside said shell,
said chute communicating between said reservoir and said tray to provide gravity feed of seed therebetween, and
a fly-in access opening in said shell, said access opening communicating between the exterior of said shell and said tray and being large enough to allow birds to fly into said shell,
the extent of said shell between said opening and the upper end of said body being large enough to prevent squirrels resting on said end from reaching into said opening,
wherein said shell is convexly curved and has upper and lower wall portions, said wall portions intersecting at a plane of maximum diameter.

30. The birdfeeder of claim 29 wherein said access opening is in said lower wall portion of said shell.

31. The birdfeeder of claim 30 wherein said access opening is at least 7 inches across.

32. The birdfeeder of claim 29 wherein said upper wall portion of said shell and said wall means define said reservoir, and said lower wall portion of said shell and said wall means define said chute.

33. The birdfeeder of claim 29 further comprising a hanger, said hanger having a rod portion extending along said axis and mounted to said body and a hook portion extending from said rod portion of said hanger.

* * * * *